(12) United States Patent
Marco

(10) Patent No.: US 12,052,729 B2
(45) Date of Patent: Jul. 30, 2024

(54) TRANSMISSION PRE-EMPTION

(71) Applicant: JRD COMMUNICATION (SHENZHEN) LTD., Guangdong (CN)

(72) Inventor: Olivier Marco, Colombes (FR)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 344 days.

(21) Appl. No.: 17/598,824

(22) PCT Filed: Mar. 27, 2020

(86) PCT No.: PCT/IB2020/052928
§ 371 (c)(1),
(2) Date: Sep. 27, 2021

(87) PCT Pub. No.: WO2020/194258
PCT Pub. Date: Oct. 1, 2020

(65) Prior Publication Data
US 2022/0183050 A1    Jun. 9, 2022

Related U.S. Application Data

(60) Provisional application No. 62/825,421, filed on Mar. 28, 2019.

(51) Int. Cl.
| | | |
|---|---|---|
| H04W 72/14 | (2009.01) | |
| H04L 1/18 | (2023.01) | |
| H04L 1/1812 | (2023.01) | |
| H04L 1/1867 | (2023.01) | |
| H04W 72/12 | (2023.01) | |

(Continued)

(52) U.S. Cl.
CPC ............ H04W 72/23 (2023.01); H04L 1/1812 (2013.01); H04L 1/1887 (2013.01); H04W 72/569 (2023.01)

(58) Field of Classification Search
CPC ....... H04L 1/1887; H04L 1/08; H04L 1/1812; H04L 1/1822; H04L 1/1854; H04L 1/1861; H04L 1/1835; H04L 1/1874; H04L 47/245; H04L 5/0044; H04L 5/0053;
(Continued)

(56) References Cited

U.S. PATENT DOCUMENTS

| | | |
|---|---|---|
| 2018/0219604 A1 | 8/2018 | Lu et al. |
| 2019/0053211 A1* | 2/2019 | Ying ................... H04W 72/044 |

(Continued)

FOREIGN PATENT DOCUMENTS

| | | |
|---|---|---|
| CN | 107431591 A | 12/2017 |
| WO | 2012/110368 A1 | 8/2012 |

(Continued)

OTHER PUBLICATIONS

Qualcomm Incorporated, "Autonomous Uplink Access for eLAA", 3GPP TSG-RAN2 Meeting #99, R2-1709631, 2017.
(Continued)

*Primary Examiner* — Awet Haile
(74) *Attorney, Agent, or Firm* — PV IP PC; Wei Te Chung; Zhigang Ma

(57) ABSTRACT

Processes and systems to allow for pre-emption of transmissions scheduled on configured grant resources, and subsequent autonomous retransmission using a subsequent occurrence of the configured grant resources.

5 Claims, 10 Drawing Sheets

(51) Int. Cl.
*H04W 72/23* (2023.01)
*H04W 72/566* (2023.01)

(58) Field of Classification Search
CPC ............... H04L 5/0055; H04W 72/23; H04W 72/1268; H04W 72/566; H04W 72/569
See application file for complete search history.

(56) References Cited

U.S. PATENT DOCUMENTS

| | | | |
|---|---|---|---|
| 2020/0274654 A1* | 8/2020 | Loehr | H04L 1/1887 |
| 2021/0211239 A1* | 7/2021 | Fan | H04L 49/3072 |
| 2022/0217760 A1* | 7/2022 | Iyer | H04L 5/0053 |

FOREIGN PATENT DOCUMENTS

| | | |
|---|---|---|
| WO | 2016/163065 A1 | 10/2016 |
| WO | 2019/032748 A1 | 2/2019 |
| WO | 2020/170043 A2 | 8/2020 |

OTHER PUBLICATIONS

"Rapporteur correction for 25.321 MAC specification", Nokia, 3GPP TSG-RAN2 Meeting #96, R2-168145, Nov. 18, 2016.

* cited by examiner

TRANSMISSION PRE-EMPTION

CROSS-REFERENCE TO RELATED APPLICATIONS

This application is a National Stage of International patent application PCT/IB2020/052928, filed on Mar. 27, 2020, which claims priority to U.S. Provisional Patent Application No. 62/825,421 filed Mar. 28, 2019, the disclosures of which are incorporated by reference in their entireties.

TECHNICAL FIELD

The following disclosure relates to pre-emption of transmissions in a cellular communication system.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention is set out in the following description.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
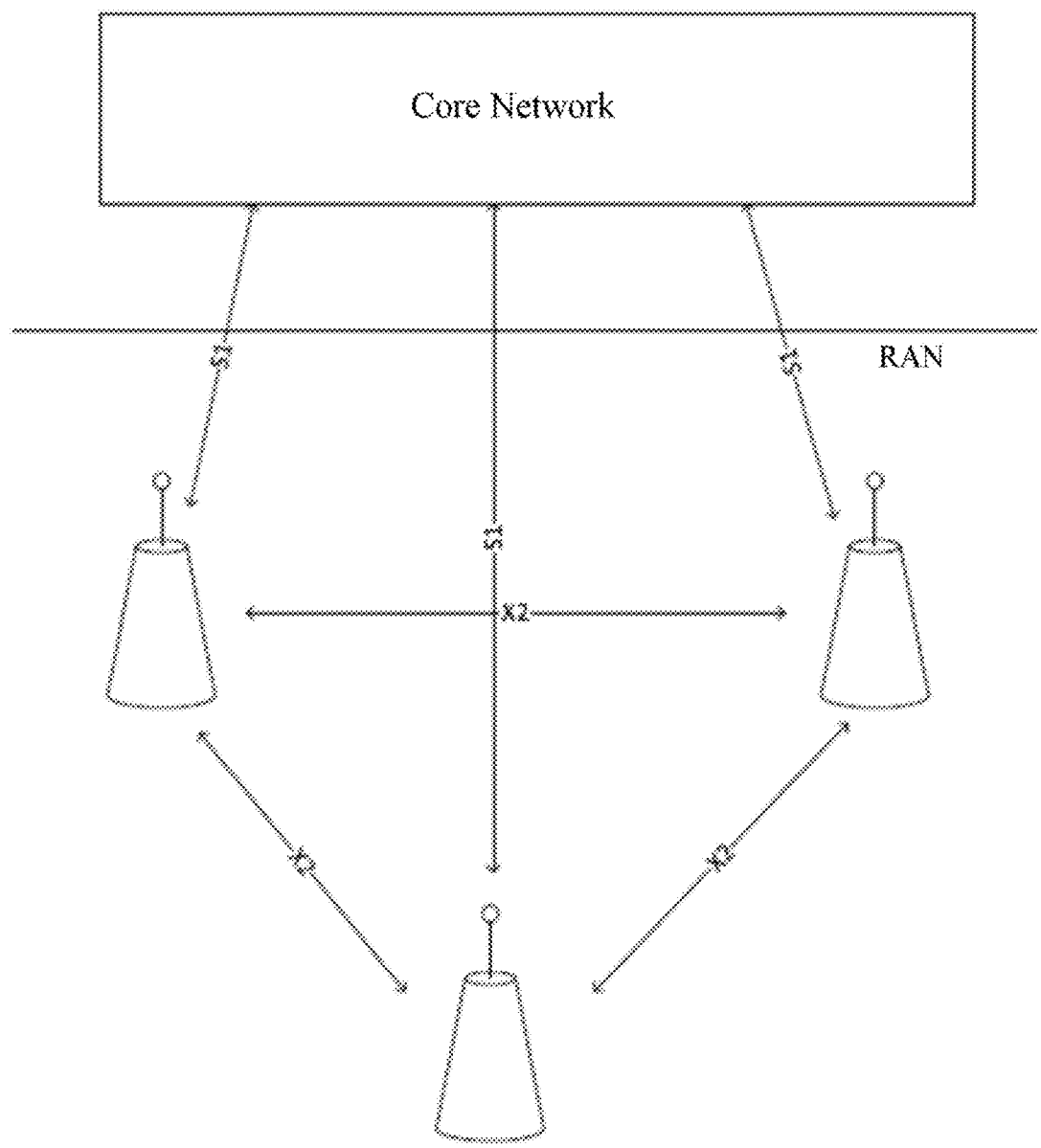
FIG. 1 shows a schematic diagram of selected elements of a cellular wireless network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

The lower layers of NR are split into the several layers, along which the Radio Link Control (RLC), the Medium Access Control (MAC), and the physical layer.

- The MAC sublayer offers to the RLC sublayer logical channels
- The physical layer offers to the MAC sublayer transport channels, e.g. UL-SCH (in uplink). The MAC PDU transmitted on UL-SCH is referred to as a transport block (TB).

In NR Rel-15, the MAC entity shall have an uplink grant to transmit on the UL-SCH transport channel. The uplink grant provides PHY time/frequency resources for the corresponding PUSCH transmission. The uplink grant is either received dynamically on the PDCCH (dynamic grant, DG), in a Random Access Response, or configured semi-persistently by RRC (configured grant, CG).

With Configured Grants, the gNB can allocate uplink resources for the initial HARQ transmissions to UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

Such uplink resources for the initial HARQ transmission opportunity will sometimes be referred to as "transmission occasion" (TO) of the corresponding CG.

In NR, UL skipping is enabled by default for CG (and can be configured for DG). The MAC entity shall not generate a MAC PDU for the HARQ entity if the following conditions are satisfied:

- the MAC entity is configured with skipUplinkTxDynamic and the grant indicated to the HARQ entity was addressed to a C-RNTI, or the grant indicated to the HARQ entity is a configured uplink grant; and
- there is no aperiodic CSI requested for this PUSCH transmission as specified in TS 38.212 [9]; and
- the MAC PDU includes zero MAC SDUs; and
- the MAC PDU includes only the periodic BSR and there is no data available for any LCG, or the MAC PDU includes only the padding BSR.

In such case, the UL grant is "skipped" (no transmission is performed).

CG may be used for sporadic low latency traffic. In such case, a short periodicity is used, and most of TOs of the CG are not used (skipped).

In NR, a "assume ACK" scheme is used for CG, by which upon sending a new transmission, the UE will assume that it is ACKed (at HARQ level) upon a timer expiry (configured grant timer), if it has not received a retransmission request by the gNB before (with a DG requesting a retransmission for the corresponding HARQ process). This requires that the gNB must very efficiently detect the transmission, since in case of missed detection, the UE will consider that the TB was successfully transmitted at HARQ level which can lead to packet loss (if e.g. RLC UM is used).

In NR Rel-16, it is expected that multiple CG are supported.

Additionally, MAC entity can be configured for bundle transmission, for dynamic UL grant and/or configured UL grant. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

The MAC sublayer provides data transfer services on logical channels. To accommodate different kinds of data transfer services, multiple types of logical channels are defined i.e. each supporting transfer of a particular type of information. For user traffic, Dedicated Traffic Channel LCHs are used. The MAC performs multiplexing of MAC SDUs from one or different logical channels onto transport blocks (TB) to be delivered to the physical layer on transport channels. The multiplexing is performed within the Logical channel prioritization (LCP) function, based on LCH parameters such as LCH priority.

LCH mapping restrictions can be defined on a per LCH basis, restraining the possible mapping of a given LCH on specific UL grants (for instance, on CG Type 1 grant only). In NR Rel-16, it is expected that multiple CG are supported, and that the LCH mapping restriction is extended to enable for instance mapping of any LCH to any CG.

In NR, Buffer Status Report (BSR) is used to provide the serving gNB with information about UL data volume in the MAC entity. The reporting is done by aggregating LCHs in Logical Channel Groups (LCG). Each logical channel may be allocated to an LCG using the logicalChannelGroup. The maximum number of LCGs is eight.

A BSR is triggered according to several possible conditions, such as when the MAC entity has new UL data available for a logical channel which belongs to an LCG (and which has higher priority than existing available data).

The BSR MAC Control Element (CE) has several formats. Buffer Status Report (BSR) MAC CEs consist of either:

- Short BSR format (fixed size); or
- Long BSR format (variable size); or
- Short Truncated BSR format (fixed size); or
- Long Truncated BSR format (variable size).

The BSR formats are identified by MAC PDU subheaders with LCIDs.

Short formats enable to report 1 LCG buffer size (BS), by including an LCG ID and BS.

Long formats enable to report up to 8 LCG BS, by including an LCG bitmap and corresponding BSs.

Truncated versions are when the full version would not fit, so that only partial information is sent.

The Buffer Size field identifies the total amount of data available according to the data volume calculation procedure in TSs 38.322 and 38.323 [3] [4] across all logical channels of a logical channel group after the MAC PDU has been built (i.e. after the logical channel prioritization procedure, which may result the value of the Buffer Size field to zero). The amount of data is indicated in number of bytes. This amount of data is referred to as data available for transmission for the LCG. The size of the RLC and MAC headers are not considered in the buffer size computation.

The choice between Long or Short format is decided when the MAC PDU containing the BSR is to be built. If more than one LCG has data available for transmission at that time, MAC reports Long BSR for all LCGs which have data available for transmission, otherwise, MAC reports Short BSR.

An UL grant conflict (or collision) occurs when corresponding PUSCH transmission would overlap in time and/or in time/frequency.

Generally, a UE might not have the capability within a single HARQ entity to transmit PUSCH transmissions overlapping in time even if the corresponding time/frequency radio resources do not overlap, i.e. UL grant collision occurs when corresponding PUSCH transmission would overlap in time, at least within the same carrier.

However, a UE may also have a capability to transmit time overlapping PUSCH transmissions as long as they are not overlapping in frequency (for instance, a UE may support UL CA and the capability to transmit 2 PUSCHs at the same time on two different carriers). In such case, UL grant collision occurs when corresponding PUSCH transmission overlap in time/frequency.

As it can be seen, UL grant conflict/collision is also a matter of UE capability, and the invention does not restrict to a particular kind of conflict. An UL grant conflict/collision may be generally defined as a situation when the UE does not have the capability to transmit simultaneously the PUSCH transmissions corresponding to the UL grants (while it could have transmitted those PUSCH separately).

Note that generally:
- a DG is sent following an earlier BSR (Buffer Status Report) from the UE, hence data transmission is expected as there should be data available for transmission
- a CG may be used for sporadic traffic (for latency reduction purpose), in which case most of the time there is no data to transmit and the transmission may be skipped. In such case, an UL grant conflict may occur only when there is effectively data available for transmission on the corresponding UL grant.

The common understanding for Rel-16 IIoT is that in case of conflict, UL grants should be prioritized based on the highest priority of data that can be transmitted in the grant.

For handling UL grant conflict, there are 2 main cases:
1) MAC prioritizes/selects the grant—This is for instance the case in Rel-15, for which configured grants (CG) conflicting with a dynamic grant (DG) are ignored i.e. not processed by MAC.
2) MAC does not perform such prioritization/selection—An example is when MAC has handled a first DG (e.g. prepared and submitted the TB for transmission), and receives a later DG conflicting with the first one. The general understanding is that the NW sends the $2^{nd}$ DG with full knowledge that it should pre-empt (have priority) over the first one. Hence it was proposed that MAC handles the $2^{nd}$ DG and that PHY handle conflicting transmissions.

Applying the common understanding for Rel-16 IIoT that in case of conflict, UL grants should be prioritized based on the highest priority of data that can be transmitted in the grant, an issue may occur if the lower priority data is from a CG, as described below.

It is possible that a new transmission on a CG is pre-empted, for instance by a higher priority CG transmission (it was agreed that CG/CG conflict is possible), or by a DG (which could be for instance for a retransmission of higher priority data).

Generally, CG are used for UM data (either periodic or sporadic low latency). In particular, it is particularly fitted for URLLC traffic. Hence, CG new transmission pre-emption would lead to packet loss. If CG is used for sporadic URLLC traffic, this is not acceptable as this would impact reliability.

The following disclosure provides solutions to handle conflicting transmissions between a lower priority configured grant transmission and a higher priority transmission.

In case the lower priority configured grant transmission is pre-empted by the higher priority transmission, methods to perform retransmission are disclosed which avoid packet loss (either NW based, thanks to a pre-emption indication, or UE based).

We consider an example scenario with 2 LCHs.

LCH A corresponds to middle priority URLLC traffic

LCH B corresponds to high priority URLLC or TSN traffic

LCH A is mapped to CG A.

LCH B is either mapped to a CG B, and/or may use dynamic scheduling (DG B, for which LCH restrictions allow LCH B mapping).

Scenario 1: collision of a CG A (middle priority) new transmission with ULG B (high priority)

The scenario under consideration is the following:

Event A)

New data arrives on LCH A for transmission on CG A

MAC starts the new transmission processing for transmission on next CG A transmission opportunity (TO) (LCP, build TB A, deliver to PHY)

Event B)

MAC receives a request for transmission of LCH B data on a ULG (Uplink Grant) B, conflicting with the CG A The ULG B might be for instance:

B.1) A CG B (the request is when new data arrives on LCH B)

B.2) A DG B (the request is reception of a DG B. It might be for instance a DG for retransmission of an earlier CG B transmission)

Considerations on processing timeline:
a. —regarding dynamic grants: processing time to build the PUSCH for transmission on the grant is limited and it is expected that MAC/PHY processing may be started as soon as the DG is received
b. —regarding configured grants: those grants are already known in advance by the UE. In case of data arrival for transmission on such CG, the time instant when UE shall start MAC/PHY processing to build the PUSCH for transmission on the grant is not really specified.

Two main processing timelines could be envisaged:
1) When data arrives for transmission on a CG, MAC processing is started immediately
2) When data arrives for transmission on a CG, MAC processing is delayed to a time instant where there is still enough MAC/PHY processing time to perform the transmission on the next CG TO.

Even if it is not specified, it is expected that a UE would wait for possible data(s) before starting MAC/PHY processing by e.g. waiting the latest time instant still allowing enough processing time for the transmission on the next CG TO. This can be beneficial to allow more time for e.g. multiplexing more data in the PUSCH.

If we consider URLLC traffic, for which CG is used with short periodicities, requiring the UE to delay MAC/PHY processing could on the contrary add UE complexity. It may be beneficial to start MAC/PHY processing to build the PUSCH for transmission as soon as data arrival for transmission on such CG, for transmission on the next available CG TO.

In this application, we do not consider further such processing timeline aspects. To simplify the analysis, as the discussion is mainly on URLLC traffic, we consider that for CG, the MAC processing is started as soon as new data arrives for transmission on such CG (e.g. as described in Event A above).

However, it is understood that the MAC/PHY processing could actually be delayed to any time instant such that there is still enough MAC/PHY processing time before the CG. In that case, the corresponding event to be taken into account has to be understood as the time instant when MAC/PHY processing is started (i.e. Event A would be the time when such processing starts, independently on when the data for LCH A was received before).

It is understood that if Event B) happens before Event A), MAC can perform UL grant prioritization/selection, e.g. by ignoring the CG A transmission opportunity conflicting with the ULG B.

The scenario under considerations is when Event A) occurs before Event B).

Figure 2:
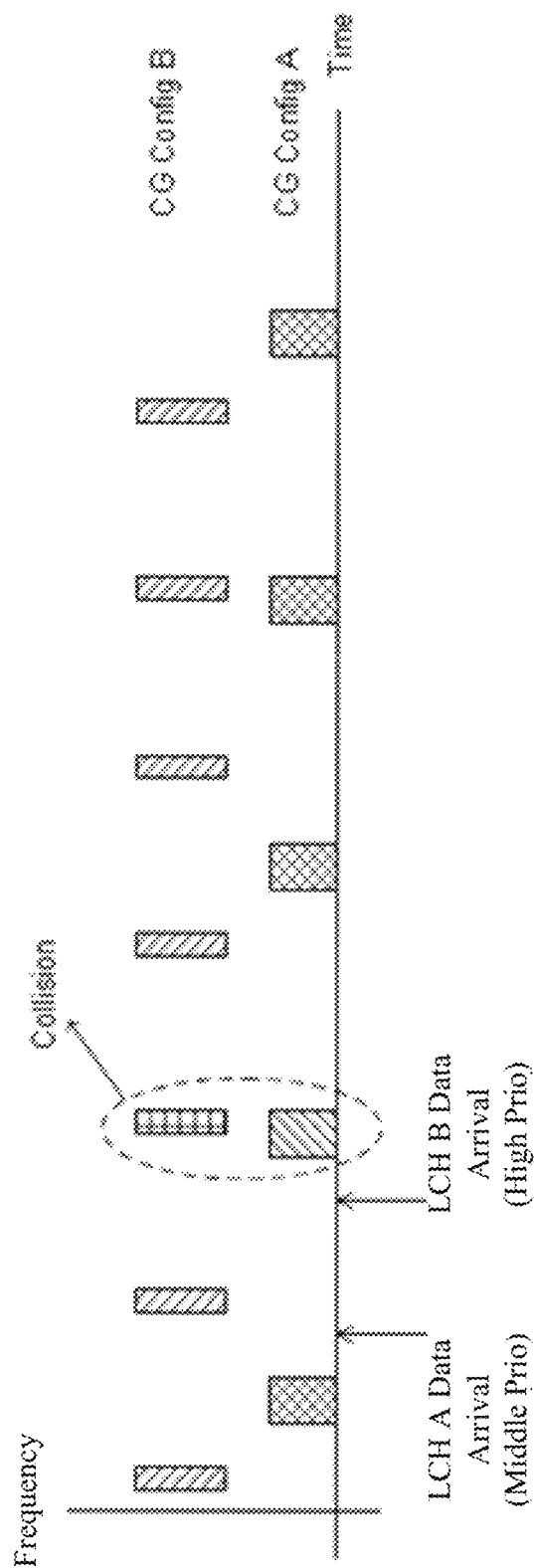
FIGS. 2 and 3 show examples of prioritising transmissions.
Figure 3:
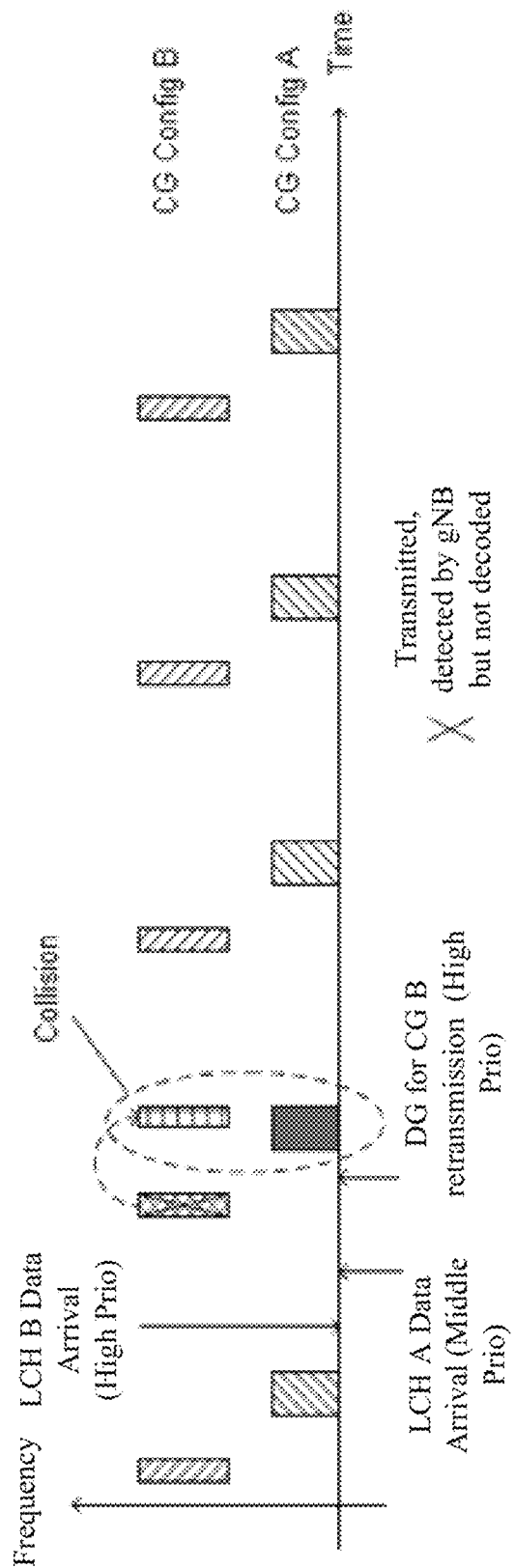

It is assumed that UE has enough processing time for transmitting on ULG B. FIGS. 2 & 3 shows cases B.1 and B.2.

The goal of intra-UE prioritization is generally to transmit first data with higher priority (as long as e.g. processing times allow it). Hence in case of conflict, UL grants (or corresponding PUSCH transmissions) should preferably be prioritized based on the highest priority of data that can be transmitted in the grant.

Upon Event B in the above scenarios:
  in case MAC already submitted a new transmission request to PHY for a TB A, an indication from PHY may be introduced to indicate whether the TB A transmission was indeed pre-empted. In particular, such indication may be sent whenever the pre-emption would result in the gNB not noticing a new transmission on a CG. For instance, if only data part was pre-empted but not DMRS, the indication might not be sent as the gNB may be able to detect the new transmission (even if it can't be decoded). In the remaining of the discussion, we assume a pre-emption notification indicates that the TB transmission was pre-empted such that the corresponding TB cannot be detected by the gNB.
  in case MAC did not yet submitted TB A (corner case when the Event B occurs e.g. during LCP, before final submission to PHY), MAC may notice by itself, however for simplicity it is assumed that MAC would anyway complete the started processing and submit the TB A to PHY. This also simplifies the specification of the procedure (it assumes UL grant are processed sequentially).

The proposed solutions may avoid difficulties with prior approaches in which pre-emption of TB A leads to packet loss for LCH A which may not be acceptable.

Set out below are examples intended to address the previous issues.

If the NW is made aware that the TB A transmission was pre-empted an improved retransmission process can be implemented. For this purpose, it is proposed that an indication is sent to the gNB so that gNB can trigger a retransmission more efficiently.

The indication could be a new indication or reuse existing indications, with appropriate enhancements. Reusing existing indications has the benefit of lowering the specification and implementation complexity.

Figure 4:
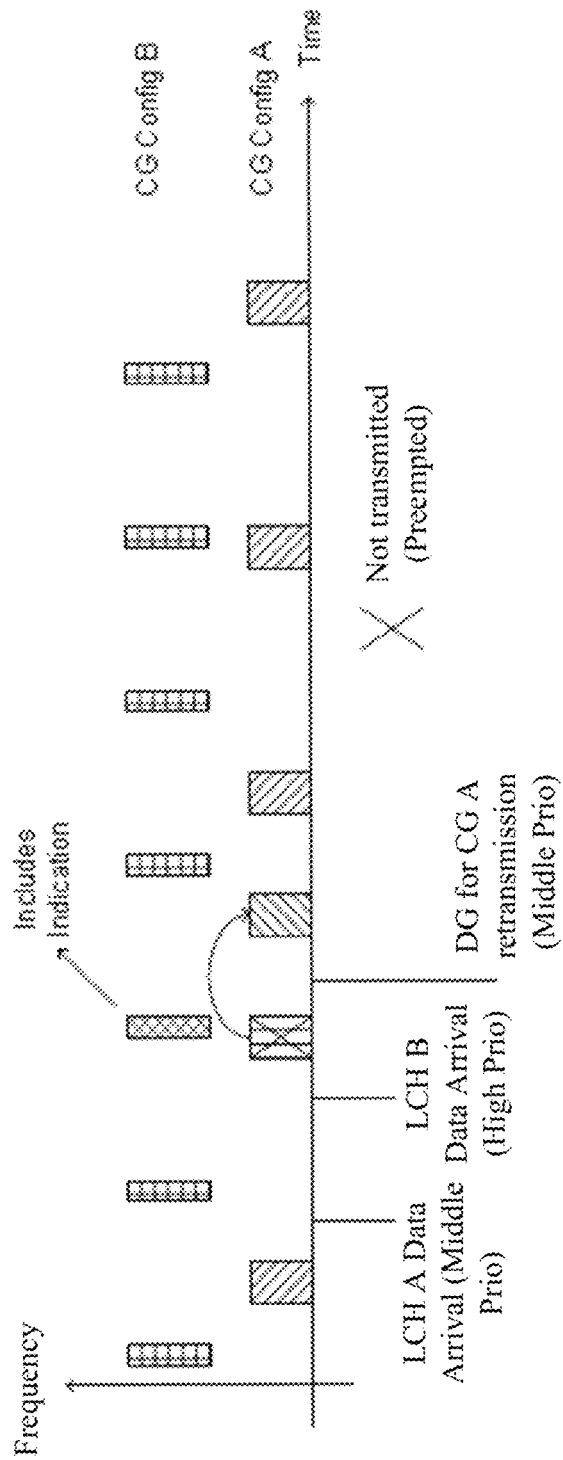
FIG. 4 shows an example of utilising BSR MAC CE to indicate retransmission.

The BSR MAC CE can be re-used to provide the required indication as shown in FIG. 4.

According to conventional processes if LCH A and B are on 2 different LCGs (LCG is the granularity for BS) (we also assume data arrival fit into the TBs, both for LCH A and LCH B):
  when TB A is built: short BSR is included indicating BS0 for LCH A
  when TB B is built: short BSR is included indicating BS0 for LCH B (nothing for A because no data available for transmission when TB B built).

In conventional systems the LCH data already handled by the multiplexing entity and included in a TB is no longer part of data available for transmission. This is expected as the reported BS should only include data for which the NW scheduler has to schedule UL resources. In addition, only LCG(s) which have data available for transmission (at the time the MAC PDU containing the BSR is built) are considered to select between short or long BSR formats. That is to say, if no more than 1 BS is not 0, short BSR will be used.

It is proposed that including BS 0 indication for a LCG (for which otherwise the BS would not be included at all) is used to indicate that there pending HARQ data for this LCG. This can be realized for instance by considering, when selecting between short or long BSR formats, LCG(s) which have data available for transmission AND LCG(s) which have pending HARQ data (i.e. for which at least one of the LCH have pending HARQ data), at the time the MAC PDU containing the BSR is built. Pending HARQ data for the LCH here means that a TB containing LCH data is still considered for retransmission (i.e. was not ACK from HARQ point of view). In the case of CG, that could be for instance because the ConfiguredGrantTimer is running.

In the example above, this would result in the following:
  when TB A is built: short BSR is included indicating BS0 for LCH A
  when TB B is built: long BSR is included indicating BS0 for LCH B and BS0 for LCH A (because there is pending HARQ data for LCH A).

Note that if there was no pre-empted TB A, only short BSR indicating BS0 for LCH B would be included in TB B.

The additional indication enables the NW to know that there is pending HARQ data for LCH A. From LCH mapping, the NW scheduler can derive the related CG and HARQ process and can schedule retransmissions efficiently. Hence, TB A is retransmitted and packet loss is avoided.

Note that if there was data available for transmission for LCH A left after building TB A, then BS for LCH A would have been included in TB B. In such case, the NW cannot be sure is there is pending HARQ data for LCH A, however the NW might still rely on blind retransmission request for that case. The feature may enable to limit the blind retransmission requests to corner cases.

The feature can be used even in non-collision cases. Consider TB A is first sent followed by TB B, but TB A is not detected. In conventional systems, the NW would not schedule any retransmission for TB A, which would eventually be lost. With the additional feature, TB B would have a BS 0 indication for LCH A, which indicates to the NW that there is pending HARQ data for this LCH, from which the NW might derive the related HARQ process and schedule a retransmission.

Instead of using BS 0, other indications in MAC BSR could be used, such as using special values. It is also possible to define a mode of operation where BS would not only include data available for transmission in RLC/PDCP as per legacy, but also new pending HARQ data, as this may be only required in specific use cases, and may be deactivated when not needed to limit signalling overhead.

The indication could also be a new indication, for instance in the form of a new MAC CE. For instance, it could be a LCH pre-emption bit or bitmap, indicating whether LCH were pre-empted by another transmission. Similarly, it could be a CG pre-emption bit or bitmap, indicating whether a CG were pre-empted by another transmission. Such indications can be used by the NW to schedule retransmissions. The NW may configure sending of such indications only when required, to prevent useless signalling overhead.

Generally, as long as the Con figuredGrantTimer is running, the BSR or alternative indication can be used to request a retransmission. For instance, a BSR on a next occurrence of CG A with LCH A BS not set to 0 while no LCH A data is included would indicate a request for retransmission. That is to say, the indication does not have to be restricted to be sent in a TB pre-empting another transmission.

Figure 5:
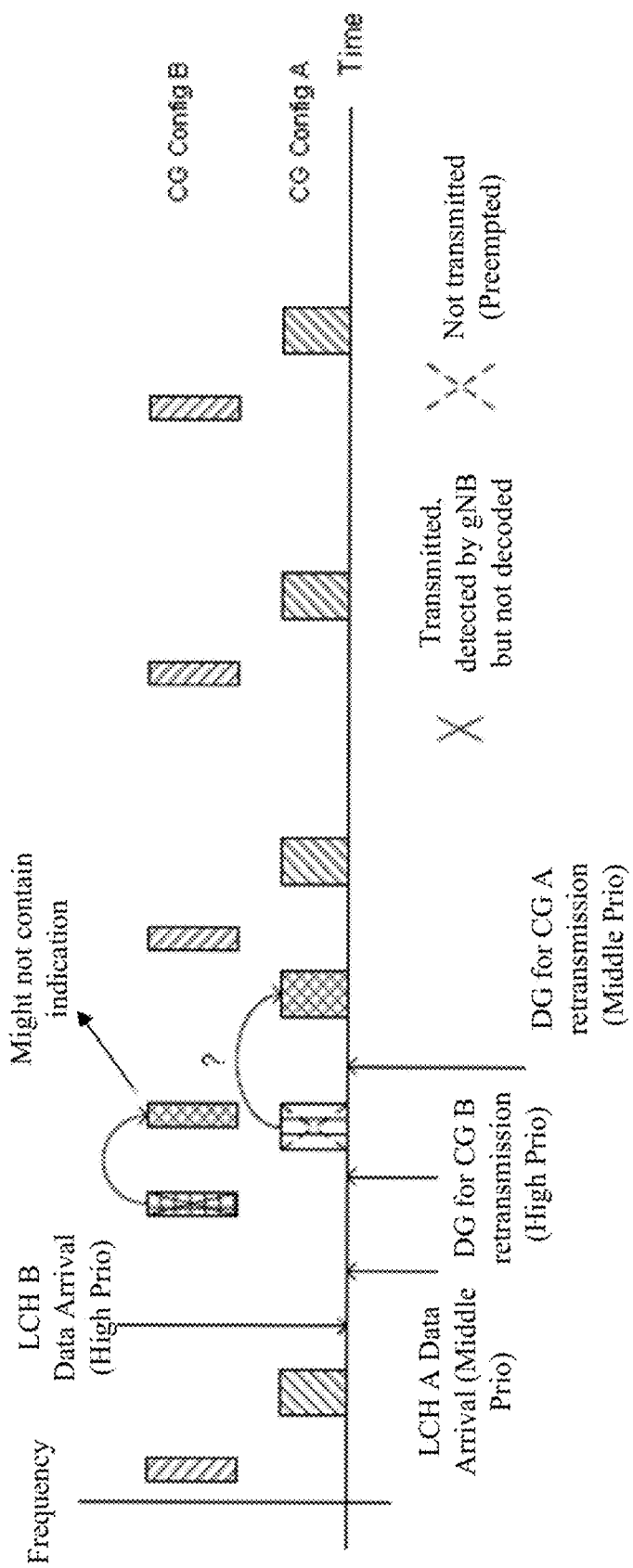
FIG. 5 shows an example of retransmission.

It can be noted that this solution may not work in case TB A is pre-empted by a retransmission of TB B, because TB B might have been built earlier than LCH A data arrival (hence TB B would not contain any information on the pre-emption). However, this may be considered as a corner case, which can also be to some extent avoided by the gNB by scheduling a non-overlapping retransmission or by blindly requesting a retransmission of TB A in case there was a pre-empted transmission as shown in FIG. 5.

Generally, for URLLC traffic using CG, SR would be masked, such as that even if a regular BSR is triggered, no SR is sent. As an alternative indication, a SR trigger can be added such that a SR is triggered in case such TB pre-emption occurs. This SR could be associated to LCH or CG with existing (or extended) SR mapping rules, which enables the NW to derive which HARQ process might need a retransmission.

As discussed previously, we are mainly considering the scenario where Event A (middle priority) occurs before Event B (high priority). In the scenario where Event B (high priority) occurs before Event A (middle priority), MAC could perform UL grant prioritization/selection to avoid the UL grant collision. However, it can also be beneficial to unify both scenarios handling. The following options are then possible:

Option 1: non-unified behaviour
1—If Event A) occurs before Event B):
TB A is pre-empted.
NW is aware of it thanks to indication in TB B.
TB A transmission will be ensured by DG A retransmission request.
2—If Event B) occurs before Event A):
MAC performs UL grant prioritization/selection, e.g. when Event A) occurs, it ignores the CG A transmission opportunity conflicting with the ULG B. The next CG A transmission opportunity will be used (if it can, i.e. unless other conflict occurs).
Option 2: unified behaviour
In both cases 1— and 2—, MAC processes the CG A for TB A (same behaviour).
TB A is pre-empted similarly in both cases.
In case 1—, NW may be aware of TB A transmission thanks to indication in TB B.
In case 2—, NW is not aware of such TB A transmission, hence blind retransmission requests would be needed.

This option is adapted if CG potential collisions are not too frequent, in which case the NW can decide to always blindly send a DG A for retransmission when a TB B was sent on a TO colliding with CG A.

This option is adapted as well if it is not acceptable for CG A to wait for the next TO. A DG A for retransmitting pre-empted TB A could be faster (depending on CG A periodicity). However with Option 1, this is not possible in case 2—as TB A is actually not pre-empted.

It is proposed that a LCH or CG can be configured to operate in Option 1 or Option 2 mode of operation.

An alternative way to solve the issue is to rely on UE performing (autonomous) HARQ retransmission of TB A.

Upon notification of TB A pre-emption, the HARQ procedure for the corresponding HARQ process is modified. The proposed new behaviour is dynamic, conditional to "Upon notification of TB A pre-emption".

For instance, a HARQ retransmission can be scheduled on the next transmission opportunity for the HARQ process.

Practically, as the gNB expects a new transmission, the TB A retransmission needs to use RV 0 and would be handled from PHY point-of-view as a new transmission.

In conventional systems, a ConfiguredGrantTimer timer is used to prevent delivering of CG for the same HARQ process to MAC HARQ entity while it is running, hence preventing new transmissions while the timer is running.

In one option, this behaviour is modified. The ConfiguredGrantTimer is used to prevent new transmissions (meaning LCP/TB building) on the HARQ process, but the CG is still delivered to the MAC HARQ entity so that it can be used for the retransmission. The ConfiguredGrantTimer may be restarted/extended to ensure it extends till the next transmission opportunity for the HARQ process and used to prevent new transmissions (meaning LCP/TB building) on the HARQ process.

Another option on the contrary is to stop the ConfiguredGrantTimer to allow that the CG is delivered to the MAC HARQ entity and can be used for the UE performing (autonomous) HARQ retransmission for this HARQ process.

For a given UL grant and HARQ process associated with this grant, MAC HARQ entity derives whether it triggers the HARQ process to perform a new transmission or a retransmission. When triggering the HARQ process to perform a new transmission, a TB is built and delivered to the HARQ process.

From a MAC level point of view, the proposed new feature can be modelled in 2 ways.

One way is that MAC entity performs a new transmission but without building a new TB (without obtaining a MAC PDU to transmit from the Multiplexing and assembly entity), and just rely on the MAC PDU already in the HARQ buffer for that HARQ process. This remains aligned with the principle to not perform retransmissions on a CG TO, but only new transmission.

Figure 6:
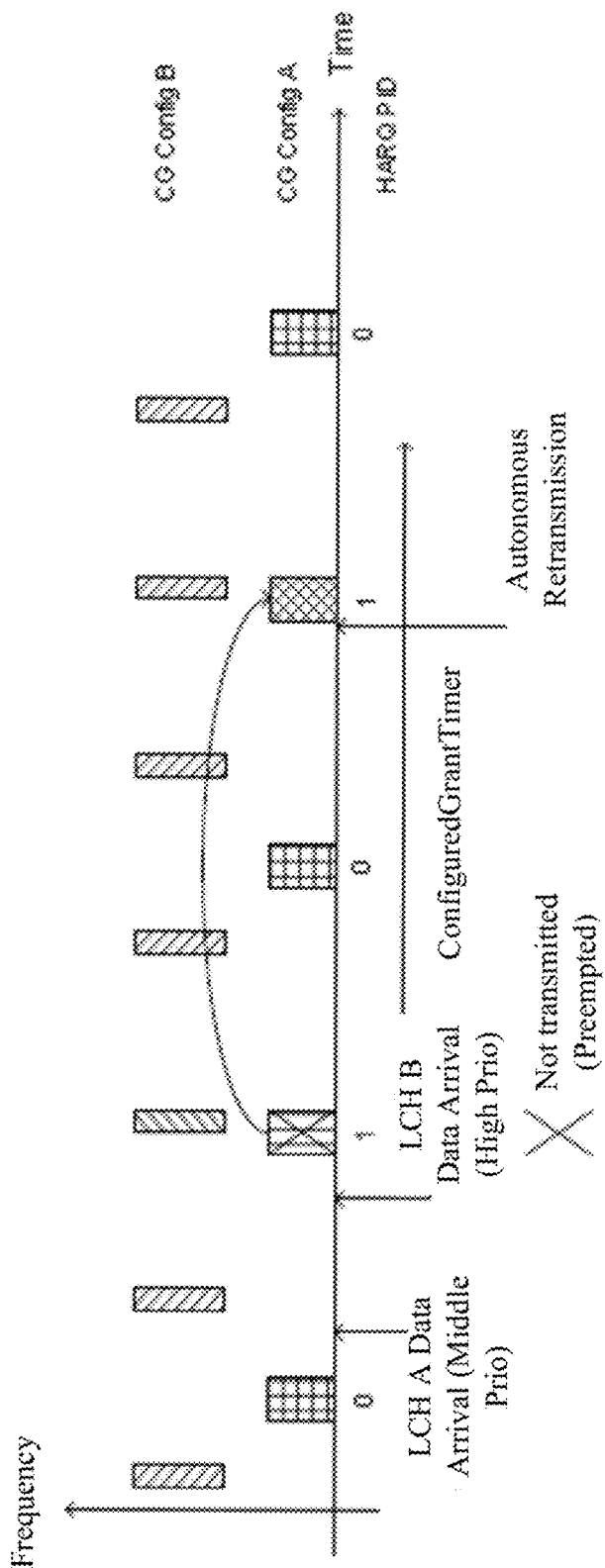
FIG. 6 shows an example of retransmission on a CG resource.

The other way is that the MAC entity performs a retransmission on CG TO for that case. This is no longer aligned with the principle of performing only new transmission on CG TO. FIG. 6 shows an example.

As a variant of previous approach, the TB A may be resubmitted as a new TB on the first available transmission opportunity on CG A.

Again, the proposed new behaviour is dynamic, conditional to "Upon notification of TB A pre-emption".

Upon notification of TBA pre-emption:
MAC (or PHY) looks for the next (earliest) TO on CG A which is available for transmission, i.e. for which the corresponding HARQ process is available (free), i.e. not on-going (this can be determined e.g. by empty HARQ process buffer, or not running ConfiguredGrant-Timer), before the next (earliest) TO corresponding to the HARQ process used for the TB A pre-empted transmission
if found, the HARQ process buffer for TB A (i.e. MAC PDU) is copied/moved to the this available HARQ process buffer for the CG A. The initial HARQ process buffer is flushed and corresponding ConfiguredGrant-Timer is stopped.
if not found, it means the next TO on CG A which is available to retransmit TB A is actually from the same HARQ process, and the earlier described approach can be used.

The benefit of this variant approach is reduced delay. This implies that the HARQ process ID may change, which needs more MAC procedure modifications.

Figure 7:
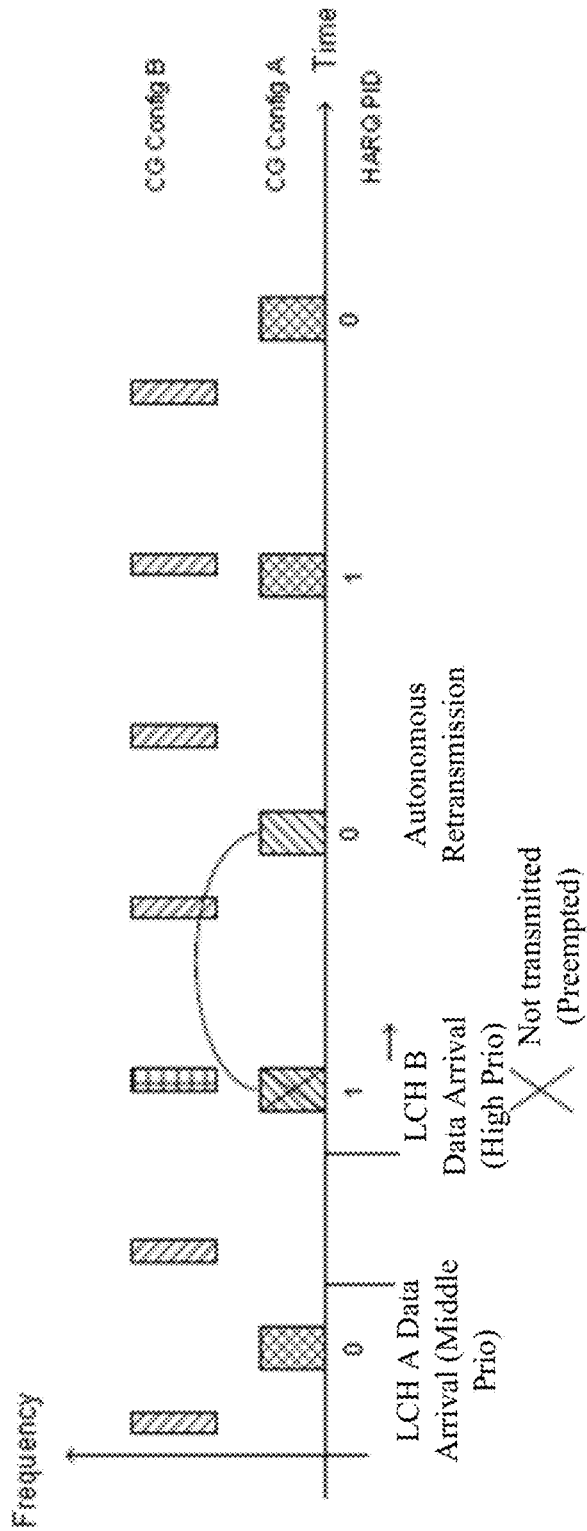
FIG. 7 shows an example of autonomous retransmission.

In the example under consideration, TB A which was initially sent with HARQ process 1 can be sent on the next CG TO with HARQ process 0 if free. However, HARQ process 0 may not be available; for instance if packet burst transmission was on-going (e.g. a TB was already submitted for that second TO). In that case, MAC would look at the next CG TO which might for instance corresponds to a HARQ process 2 which is free and can be used. In the example where only 2 HARQ processes are allocated to the CG (HARQ processes 1 and 0), if HARQ process 0 is not available, then HARQ process 1 would have to be used according to the earliest described approach (retransmission of TB A, since the same HARQ process is used). FIG. 7 shows an example.

In order to simplify this option, it could be considered to limit it to cases when there is no packet burst transmission. I.e. the next (earliest) TO would be always the following one, and could be always considered as available.

Having the UE perform autonomous retransmissions may not be always required depending of traffic characteristics. For instance, voice traffic may support limited packet loss, and performing a retransmission on a next CG occasion for voice traffic is not desired as that would add jitter.

Hence, it is beneficial to be able to configure if such autonomous retransmission is required. The configuration can be part of LCH or CG configuration. It can include whether autonomous retransmission operation on the same HARQ process or retransmission on the earliest TO is required.

In another alternative, upon notification of TB A pre-emption, the MAC new transmission procedure for TB A is reverted. This means:
LCP is reverted (assumed to not have been performed for this TB)
the LCH A data which was included in TB A is considered as new data (not yet transmitted)
configuredGrantTimer timer for the HARQ process is stopped
the HARQ buffer is flushed This approach could be attractive in a simple case such as when LCH A only can be mapped to CG A.

However, in general cases, any LCH(s) can be mapped to any CG(s) or DG, hence the LCP to be reverted might not be independent from any later LCP which has already run, such as the LCP for ULG B. For this reason, this approach is not preferred.

A variant is to consider that upon notification of TB A pre-emption, the corresponding PDCP PDUs (or RLC PDUs) should be retransmitted. However, this introduce new inter-layers interactions between MAC an upper layers. Moreover, in UM mode, PDCP or RLC are not supposed to buffer the PDUs. Hence, this approach is not preferred.

Previous options aimed to prioritize ULG B when conflicting with CG A. In another option, the ULG B conflicting with CG A is deprioritized (even though according to LCH restrictions it would transmit higher priority data).

This can be realized by ignoring the ULG B when conflicting with a new transmission for CG A, independently of the corresponding data priority.

This option is well adapted if MAC delays as far as possible the building of TB, according to processing time limitations to build the TB and be ready for PUSCH transmission. Then, according to this option, UL CG prioritization according to LCH is done as long as it is not too late to pre-empt the lower prioritization transmission. If it is too late, then the lower priority data is not pre-empted.

This option would work as follows:
1—If Event B) occurs before Event A):
MAC performs UL grant prioritization/selection, e.g. when Event A) occurs, it ignores the CG A transmission opportunity conflicting with the ULG B. The next CG A transmission opportunity will be used (if it can, i.e. unless other conflict occurs).
2—If Event A) occurs before Event B):
It is too late to preempt TB A. TB A is not preempted.
The ULG B conflicting with TB A is ignored, hence LCH B data will be transmitted on the next possible opportunity.

Figure 8:
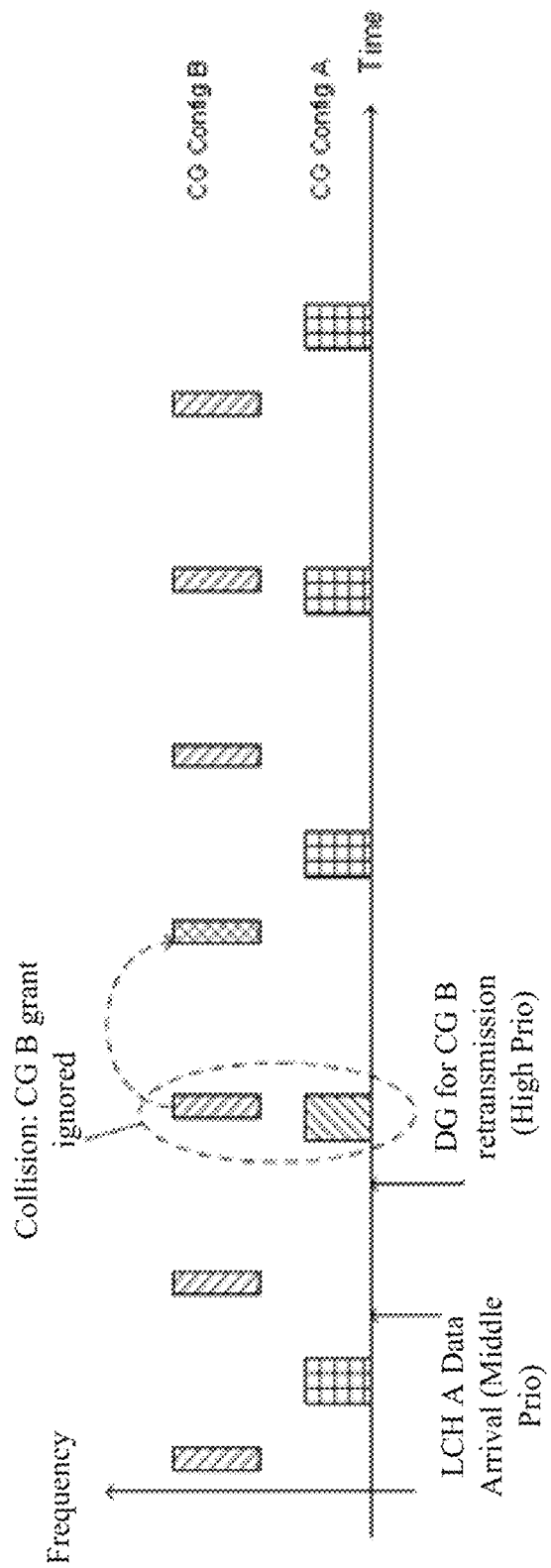
FIGS. 8 & 9 show examples of retransmissions.
Figure 9:
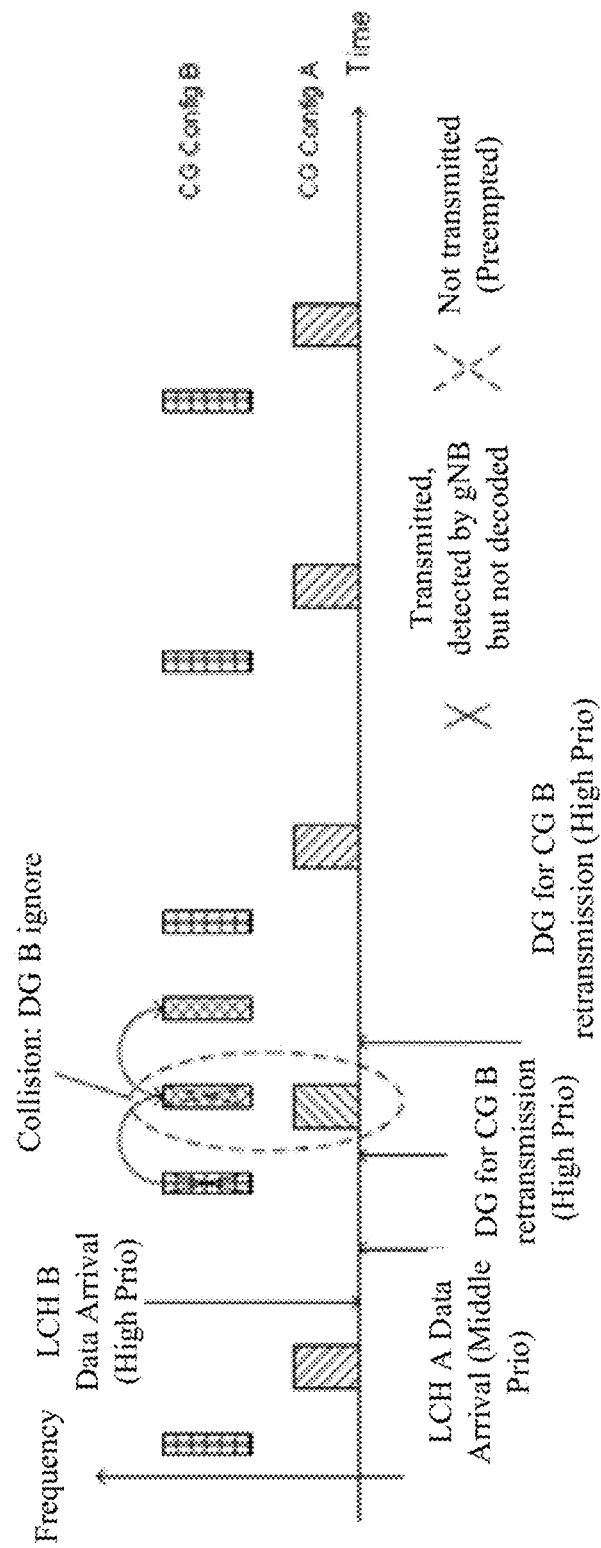

FIGS. 8 & 9 provide examples.

This behaviour would ensure preventing of packet loss on LCH A. It may be required only for URLLC like type of traffic. For traffic like voice on the contrary, sporadic packet loss can be acceptable. Hence it could be conditional to traffic characteristics, or configured as part of LCH A configuration.

In particular, the following configuration information could be useful in the context of this embodiment. They could be configured on a LCH or CG basis:
indication that a LCH (or CG) is allowed or not to be pre-empted by another LCH (or CG).
indication that a LCH (or CG) is allowed or not to pre-empt another LCH (or CG).

The indication may be absolute (TRUE/FALSE) or relative (for instance, considering lower or higher priority LCH/CG).

Figure 10:
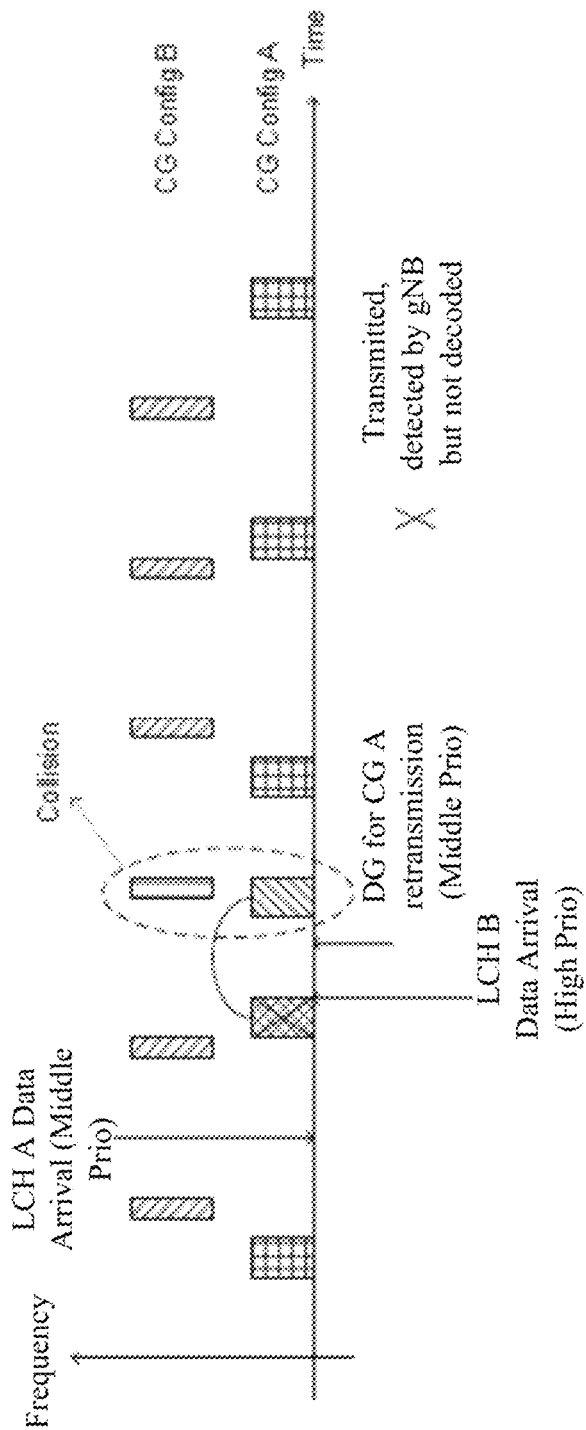
FIG. 10 shows a further example retransmission.

In a further scenario there is a collision of a CG A (middle priority) retransmission with ULG B (high priority). FIG. 10 provides an example In this scenario, pre-emption of TB A retransmission may not lead to packet loss for LCH A.

It is proposed to pre-empt the DG A for CG A retransmission (meaning, transmit TB B in ULG B, and do not transmit a TB A in DG A). This is beneficial as LCH B is higher priority. The gNB can deduce that the DG A was pre-empted, and may ask again for TB A retransmission with a further DG A.

However, when doing so, it is proposed to restart the configuredGrantTimer in order to let more time to the gNB to schedule TB A retransmission. In conventional systems, DG A would have been pre-empted by MAC performing UL grant prioritization/selection, for instance by just ignoring DG A. However, this would lead to not restarting configuredGrantTimer and potentially prevent further retransmissions if it expires. Restarting the configuredGrantTimer may also be realized by not ignoring DG A, so that it would be restarted as per normal operation of DG A, and have the corresponding TB A transmission pre-empted for instance at PHY level or by not requesting HARQ process to perform the retransmission, even though the timer is restarted.

As will appreciated the examples describe herein describe various features which may be used together or separately where appropriate. For example, the processes described in relation to a transmitter may be implemented in isolation from features described related to a receiver and vice-versa.

Where names have been suggested for certain variables or times, these are given for example only and are not intended to limit the technical function of the described features.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (FDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of uplink data transmission from a UE to a base station to which the UB is connected, the method performed at the UE and comprising:
   preparing a MAC PDU for transmission in a transmission opportunity of configured grant resources;
   pre-empting transmission of the MAC PDU in the transmission opportunity by a higher priority transmission and holding the MAC PDU in an HARQ buffer wherein the transmission opportunity is used for an initially scheduled transmission opportunity of the configured grant resources; and
   when the configured grant resources are configured with Autonomous Retransmission, performing autonomous retransmission of the MAC PDU by using a subsequent transmission opportunity of the configured grant resources, wherein the MAC PDU was prepared for transmission on an occurrence of the configured grant resources but was pre-empted,
   wherein the subsequent transmission opportunity of the configured grant resources is a first available transmission opportunity of the configured grant resources after the initially scheduled transmission opportunity, and
   wherein HARQ process corresponding to the first available transmission opportunity and HARQ process corresponding to the initially scheduled transmission opportunity are different.

2. The method according to claim 1, wherein the higher priority transmission is scheduled on overlapping resources.

3. The method according to claim 1, wherein the higher priority transmission is scheduled by a dynamic grant.

4. The method according to claim 1, wherein the higher priority transmission is scheduled by a configured grant.

5. The method according to any preceding claim 1, wherein the autonomous retransmission is a new transmission of the MAC PDU by the MAC layer.

* * * * *